US 9,670,828 B2

(12) United States Patent
Ernst et al.

(10) Patent No.: US 9,670,828 B2
(45) Date of Patent: Jun. 6, 2017

(54) MIXTURE-CHARGED GAS ENGINE AND METHOD FOR COMPENSATING FOR VOLUMETRIC EFFICIENCY DEVIATIONS IN A MIXTURE-CHARGED GAS ENGINE

(71) Applicant: MTU Friedrichshafen GmbH, Friedrichshafen (DE)

(72) Inventors: Anko Ernst, Salem (DE); Udo Sander, Salem (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 148 days.

(21) Appl. No.: 14/705,352

(22) Filed: May 6, 2015

(65) Prior Publication Data

US 2015/0233280 A1    Aug. 20, 2015

Related U.S. Application Data

(63) Continuation of application No. PCT/EP2013/003313, filed on Nov. 4, 2013.

(30) Foreign Application Priority Data

Nov. 6, 2012    (DE) .................. 10 2012 021 778

(51) Int. Cl.
*F02B 33/44* (2006.01)
*F01N 5/04* (2006.01)
(Continued)

(52) U.S. Cl.
CPC ............ *F02B 19/108* (2013.01); *F02B 37/00* (2013.01); *F01N 13/10* (2013.01); *F02B 19/12* (2013.01); *F02B 19/14* (2013.01)

(58) Field of Classification Search
CPC ......  F02B 19/08; F02B 19/1085; F02B 19/12; F02B 19/14; F02B 19/1004; F02B 37/00; F01N 3/28
(Continued)

(56) References Cited

U.S. PATENT DOCUMENTS 2,292,409 A  *  8/1942  Steward .............. F02B 19/1004
                                                                123/275
3,933,134 A  *  1/1976  Yagi .................... F02B 19/1014
                                                                123/260

(Continued)

FOREIGN PATENT DOCUMENTS

AT    EP 1158149 A1  * 11/2001    .............. F02B 43/00
DE         44 19 429 A1    12/1995
(Continued)

OTHER PUBLICATIONS

Machine Translation of Bozung et al. (Pub. No. DE 44 19 429 A1), published on Dec. 14, 1995.*
(Continued)

*Primary Examiner* — Thai Ba Trieu
(74) *Attorney, Agent, or Firm* — Taylor IP, P.C.

(57) ABSTRACT

A mixture-charged gas engine includes at least one cylinder. A combustion chamber delimited by a cylinder head, a cylinder wall, and a piston, which can be moved in the cylinder, is arranged in the at least one cylinder, and the combustion chamber is divided into a main combustion chamber and at least one pre-chamber fluidically connected to the main combustion chamber via at least one firing channel. An air-/combustion gas mixture can be supplied to the main combustion chamber via an inlet valve during an intake stroke of the piston. The mixture-charged gas engine is characterized in that a separate combustion gas supply is provided for the at least one pre-chamber.

11 Claims, 2 Drawing Sheets

(51) Int. Cl.
*F01N 3/00* (2006.01)
*F02B 19/14* (2006.01)
*F02B 19/00* (2006.01)
*F02B 19/10* (2006.01)
*F02B 37/00* (2006.01)
*F02B 19/12* (2006.01)
*F01N 13/10* (2010.01)

(58) Field of Classification Search
USPC ....... 60/605.1, 280, 286, 311, 323; 123/275,
123/273, 260, 261, 264, 267, 262
IPC .................................................. F01N 3/28
See application file for complete search history.

(56) References Cited

U.S. PATENT DOCUMENTS

| | | | | |
|---|---|---|---|---|
| 4,887,427 A * | 12/1989 | Shinzawa | ............... | F01N 13/10 60/311 |
| 5,293,851 A * | 3/1994 | Schaub | ............... | F02B 19/14 123/275 |
| 5,309,879 A * | 5/1994 | Regueiro | ............... | F02B 19/14 123/286 |
| 5,392,744 A * | 2/1995 | Regueiro | ............... | F02B 19/18 123/262 |
| 5,417,189 A * | 5/1995 | Regueiro | ............... | F02B 19/14 123/262 |
| 5,930,995 A * | 8/1999 | Watanabe | ............... | F01N 13/10 60/311 |
| 6,729,128 B2 * | 5/2004 | Shiratani | ............... | F01N 3/035 60/280 |
| 6,945,036 B2 * | 9/2005 | Kato | ............... | F01N 3/08 60/311 |
| 8,006,666 B2 * | 8/2011 | Ashida | ............... | F02B 19/12 123/267 |
| 8,291,699 B2 * | 10/2012 | Payri Gonzalez | ...... | F01N 13/10 60/280 |
| 8,826,883 B2 * | 9/2014 | Ishida | ............... | F02B 19/12 123/261 |
| 8,925,518 B1 * | 1/2015 | Riley | ............... | F02B 19/10 123/261 |
| 2010/0043744 A1 * | 2/2010 | Suzuki | ............... | F02D 19/10 123/260 |
| 2011/0214649 A1 | 9/2011 | Imamura et al. | | |
| 2012/0103302 A1 * | 5/2012 | Attard | ............... | F02B 19/12 123/260 |
| 2013/0055985 A1 | 3/2013 | Gruber et al. | | |
| 2013/0233273 A1 * | 9/2013 | Redtenbacher | ....... | F02B 19/108 123/253 |
| 2016/0245151 A1 * | 8/2016 | Yuuki | ............... | F02B 19/12 |
| 2016/0252007 A1 * | 9/2016 | Ge | ............... | F02B 19/12 |
| 2016/0252045 A1 * | 9/2016 | Jacob | ............... | F02B 19/12 |

FOREIGN PATENT DOCUMENTS

| | | | | |
|---|---|---|---|---|
| DE | 10 2004 016 260 A1 | 10/2005 | | |
| EP | 2050936 A2 * | 4/2009 | ............... | F01N 3/10 |
| EP | 2 246 551 A1 | 11/2010 | | |
| GB | 1493628 A * | 11/1977 | ............ | F02B 19/108 |
| JP | 09268910 A * | 10/1997 | | |
| JP | 10299468 A * | 11/1998 | | |
| JP | 2002364335 A * | 12/2002 | | |
| JP | 2004100489 A * | 4/2004 | | |
| JP | 2004204699 A * | 7/2004 | | |
| JP | WO 2010038374 A1 * | 4/2010 | ............... | F02B 19/12 |
| JP | 2011001829 A * | 1/2011 | | |

OTHER PUBLICATIONS

International Search Report dated Feb. 19, 2014 for International Application No. PCT/EP2013/003313 (4 pages).

\* cited by examiner

MIXTURE-CHARGED GAS ENGINE AND METHOD FOR COMPENSATING FOR VOLUMETRIC EFFICIENCY DEVIATIONS IN A MIXTURE-CHARGED GAS ENGINE

CROSS REFERENCE TO RELATED APPLICATIONS

This is a continuation of PCT application No. PCT/EP2013/003313, entitled "MIXTURE-CHARGED GAS ENGINE AND METHOD FOR COMPENSATING FOR VOLUMETRIC EFFICIENCY DEVIATIONS IN A MIXTURE-CHARGED GAS ENGINE", filed Nov. 4, 2013, which is incorporated herein by reference.

BACKGROUND OF THE INVENTION

1. Field of the Invention

The invention relates to a mixture charged gas engine, and to a method for compensating for volumetric efficiency deviations.

2. Description of the Related Art

Gas engines of the type discussed herein are known. It is hereby differentiated between pressurized or air charged gas engines on the one hand and mixture charged gas engines on the other hand. Both types of gas engines comprise at least one cylinder, wherein a combustion chamber, delimited by a cylinder head, a cylinder wall and a piston that can be moved in the cylinder is arranged in the at least one cylinder. The cylinder wall can herein also be the wall of a cylinder liner. Depending on the volume of the combustion chamber or, respectively, the diameter of the cylinder, the combustion chamber in a gas engine is typically divided into a main combustion chamber and at least one pre-chamber that is fluidically connected with the main combustion chamber via at least one opening, a so-called firing channel. A volume of a mixture that is reliably ignitable via a spark plug is admitted into the pre-chamber. During a combustion cycle of the cylinder, the mixture is initially ignited in the pre-chamber with the assistance of the spark plug. The ignition energy of the ignition spark of the spark plug is hereby intensified by the energy of the mixture volume that is ignited in the pre-chamber. The burning mixture shoots through the firing channels into the main combustion chamber, where a reliable and complete combustion is triggered due to the increased ignition energy. An air-charged gas engine is known from DE 10 2004 016 260 A1 wherein compressed air is supplied into the main combustion chamber via an inlet valve during an intake stroke of the piston. A separate combustion gas supply is provided for a pre-chamber, through which combustion gas is admitted into the pre-chamber. In one compression stroke of the piston, the drawn-in compressed air is pressed into the pre-chamber where it is mixed with the combustion gas. Subsequent ignition of the mixture occurs in the pre-chamber and finally—as already described—combustion occurs in the combustion cycle of the cylinder. An air compressed gas engine of this type is comparatively complicated and therefore expensive. In contrast, mixture charged gas engines are of comparatively simple design. Here, a turbo charger takes in an air-/combustion gas mixture through a gas mixer and compresses it. During an intake stroke of the piston, the compressed air-/combustion gas mixture is supplied via an inlet valve. It is further compressed in a compression stroke of the piston and pressed into the pre-chamber via the firing channels. Subsequently—as already described—ignition and combustion of the mixture occurs. Whereas air-charged gas engines have flushed pre-chambers with separate combustion gas supply via which the combustion gas is admitted into the pre-chamber, mixture charged gas engines are equipped with unflushed pre-chambers without their own combustion gas supply into which the air-/combustion gas mixture is supplied via the firing channels.

During the intake stroke of the piston, the air-/combustion gas mixture in a mixture charged gas engine is intermixed and homogenized as ideally as possible in order to achieve an as homogeneous and favorable cylinder charge as possible. At the same time, a volume of the mixture-line and an exhaust gas line, a mixture pressure in the mixture line and an exhaust gas pressure in the exhaust gas line, as well as an opening in the inlet as well as in the outlet valves of the cylinders are coordinated in such a way that an as high as possible volumetric efficiency—in other words an as favorable ratio as possible—is achieved after completion of charge changing of a reload actually contained in the cylinder relative to a theoretically possible maximum charge. For intermixing and homogenizing of the air-/combustion gas mixture, a spiral channel is typically provided in the cylinder head.

If the mixture charged gas engine includes more than one cylinder and/or more than one cylinder bank, cylinder individual or cylinder bank individual volumetric efficiency deviations will inevitably occur. If the engine is, for example, designed as a V-engine, two rows of cylinders that are arranged parallel to each other are arranged relative to each other in the shape of a V. The one row of cylinders arranged parallel to each other is typically referred to as "A-bank"; the row of parallel cylinders that is arranged at an angle relative to this row is typically referred to as "B-bank". It is evident thereby that typically the spiral channel that is provided in the cylinder heads for intermixing and homogenization of the air-/combustion gas mixture is optimized for the geometric conditions of the A-bank, whereby however, for cost reasons, it can also be provided in the same manner in the B-bank. In this case, a lower volumetric efficiency occurs already for the cylinders in the B-bank than for the cylinders in the A-bank. Moreover, differences in the volume in the mixture line and in the exhaust gas line, fluctuations in the mixture pressure and in the exhaust gas pressure, an ignition sequence of the cylinders as well as flow-technological correlations can lead to cylinder individual or cylinder bank individual deviations in the volumetric efficiency due to stationary as well as transient effects.

What is needed in the art is a mixture charged gas engine that can overcome some of the previously described disadvantages.

SUMMARY OF THE INVENTION

The current invention provides a mixture charged gas engine wherein such necessarily occurring volumetric efficiency deviations can be compensated for. The current invention also provides a method for compensation of these volumetric efficiency deviations. Overall, the advantages of a mixture charged gas engine are to be achieved at an as uniform as possible volumetric efficiency over all cylinders.

A separate combustion gas supply is provided for the at least one pre-chamber of a mixture charged gas engine, which makes it possible to admit combustion into the pre-chamber in addition to the air-/combustion gas mixture that is being admitted into the main combustion chamber, thus increasing the volumetric efficiency of the cylinder. It is possible to admit more combustion gas into the pre-chamber—by utilizing the realizable lambda range—than is actually necessary to increase the ignition energy. The combustion gas is hereby admitted via the at least one firing channel into the main combustion chamber, thus enriching the air-/combustion gas mixture that is supplied via the inlet valve to the main combustion chamber. In this sense, the pre-chamber is overblown. The volumetric efficiency of the cylinder is increased in this manner. In particular, a cylinder having a poor volumetric efficiency can be improved in regard to its volumetric efficiency and can be adapted to cylinders which from the outset have a better volumetric efficiency. Even if the mixture charged gas engine only has one single cylinder, it is possible to increase the volumetric efficiency of the cylinder with the assistance of the separate combustion gas supply for the pre-chamber. However, the mixture charged gas engine can include at least two cylinders and/or at least two cylinder banks, so that cylinder individual or cylinder bank individual volumetric efficiency deviations can be compensated with the assistance of the separate combustion gas supply for the pre-chambers of the cylinders.

In one embodiment, the mixture charged gas engine has a pre-chamber spark plug. In this embodiment, the pre-chamber is therefore designed as part of the spark plug. The pre-chamber can be a thin-walled metal sleeve that is provided on the spark plug and that is penetrated by the at least one firing channel. Pre-chamber spark plugs are basically known in regard to their design and functionality, so that no further explanation is given here.

The gas engine can be designed so that it can be operated with natural gas, biogas, a special gas or another gas, such as a gas containing methane. The separate combustion gas supply for the at least one pre-chamber can be fluidically connected with a storage container for the combustion gas, such as a tank, wherein no device for mixing of the combustion gas with air is provided in this fluidic connection. Accordingly, the gas engine can be designed so that pure combustion gas is admitted via the separate combustion gas supply into the at least one pre-chamber.

A mixture charged gas engine can be formed so that in a fluid path for the separate combustion gas supply of the at least one pre-chamber, a valve is arranged with the assistance of which a combustion gas volume admitted into the pre-chamber is adjustable. It is thus possible to meter the combustion gas volume for the pre-chamber by the valve in order to possibly be able to increase the volumetric efficiency of the cylinder. The valve can be designed as an electromagnetic valve—as described in DE 10 2004 016 260 A1—and/or as force-controlled valve.

With the assistance of the separate combustion gas supply, it is possible to provide a mixture in the pre-chamber that, compared to the mixture admitted into the main combustion chamber, is clearly more enriched in respect to stoichiometry. In particular, in order to keep pollutant emissions of the engine low, an as lean a mixture quality as possible in respect to stoichiometry can be realized in the main combustion chamber. A lambda value of approximately 1.7 can be set. Based on the separate combustion gas supply, it is now possible to adjust a lambda value in the pre-chamber in a range from the lower explosion limit to the upper explosion limit, such as at least 0.6 to a maximum of 1.2. On the one hand, the energy content in the pre-chamber is clearly increased—in particular compared to an unflushed pre-chamber which is supplied in a compression stroke of the piston with the mixture from the main combustion chamber—whereby the boosting effect of the ignition energy is clearly increased; on the other hand, due to the already described effect of overblowing the pre-chamber, the mixture that is present in the main combustion chamber is being enriched or, respectively, the volumetric efficiency of the cylinder is being improved.

A mixture charged gas engine can include at least two cylinders and/or at least two cylinder banks and a controller by which at least one parameter for a cylinder specific or cylinder bank specific volumetric efficiency can be captured. The valves of the pre-chamber can be controlled by the at least one controller, depending on the at least one parameter, so that the cylinder individual or cylinder bank individual volumetric efficiency deviations can be adjusted through adjustment of the combustion gas volumes admitted into the individual pre-chambers.

In one embodiment of the gas engine which does not include an appropriately designed controller, the valves that are arranged in the fluid paths for the separate combustion gas supply of the pre-chambers are adjusted one time, such as during an engine test or on an engine test bench. For example, in the engine test the distance of the individual cylinders is determined to a knocking limit, whereby all valves are adjusted so that the cylinders can be operated as closely as possible to the knocking limit. In such an embodiment it is however not possible to compensate volumetric efficiency deviations during normal operation of the engine.

If, on the other hand, a controller is provided that captures at least one parameter for a cylinder specific or cylinder bank specific volumetric efficiency and controls the valves depending on the parameter, volumetric efficiency deviations occurring during operation can be compensated for flexibly through dynamic control of the valves. A parameter that can be captured by the controller can be an exhaust gas temperature after each cylinder or after each cylinder bank, a cylinder specific or cylinder bank specific nitrogen oxide emission and/or a cylinder individual or cylinder bank individual cylinder pressure.

A mixture charged gas engine can also be provided such that an opening degree, an opening point of time and/or an opening duration of the valve is adjustable. It is possible that the valve only offers two states—namely completely open and completely closed. In this case, the combustion gas volume admitted into the pre-chamber can be determined by an opening point in time in degrees crank shaft angle and an opening duration—which can also be stated in degrees crank shaft angle. The opening duration can also be determined in that an opening point in time and a closing point in time—which also can be in crank shaft angles—are defined. If, on the other hand, it is possible to open or close the valve gradually or continuously, then an opening degree, in other words an effective opening cross section of the valve, can be varied—at a stored opening point in time or for a stored opening duration—to vary a combustion gas volume that is admitted into the pre-chamber. It is also possible to combine the various adjustment methods of a valve with each other, such as adjusting the opening degree as well as the opening point in time and/or the opening duration, in order to vary the combustion gas volume that is admitted into the pre-chamber. For this purpose, the valve can be controlled by the controller and depend upon at least one parameter.

A mixture charged gas engine can also include at least two cylinders and/or at least two cylinder banks and an exhaust gas manifold which is fluidically connected with the cylinders via outlet valves that are provided on the cylinders, wherein it also includes a turbo charger which is fluidically connected with the exhaust gas manifold, so that exhaust gas can flow from the cylinders via the exhaust gas manifold to the turbo charger. Viewed in flow direction of the exhaust gas, at least one catalytic converter that is assigned to a cylinder or to a cylinder bank can be arranged before the turbo charger and after the cylinders in such a way that an exhaust gas counter pressure of the catalytic converter contributes to an equalization of the volumetric efficiency of the cylinders or the cylinder banks.

Typically, the catalytic converter of a gas engine is arranged—viewed in flow direction of the exhaust gas—after the exhaust gas turbo charger. This, however, frequently causes problems, because the exhaust gas temperature after the turbo charger is too low to ensure an effective catalysis, or respectively because the catalytic converter is quickly poisoned by the catalyst poisons that are present in the exhaust gas at the low temperatures prevailing there. It is therefore useful to arrange at least one catalytic converter before the exhaust gas turbo charger, so that hotter exhaust gas can flow through it. This increases the efficiency of the catalysis and effectively prevents poisoning of the catalytic converter. The catalytic converter can moreover be significantly smaller than if it were located—viewed in flow direction of the exhaust gas—after the turbo charger.

Several comparatively smaller catalytic converters can be arranged in the region of the exhaust gas manifold, for example in compensators which serve to dampen vibrations and to compensate for thermal expansion of the exhaust gas manifold, wherein the layout of the catalytic converters is selected so that exhaust gas counter pressure of the catalytic converters that affects individual cylinders or individual cylinder banks results in that differences in the volumetric efficiency between individual cylinders or cylinder banks are compensated.

It is, for example, possible to vary the size of catalytic converters that are arranged after the individual cylinders. It is moreover possible to provide catalytic converters after only certain cylinders, whereas then a catalytic converter can also be provided centrally before an inlet into the turbo charger, so that no exhaust gas flows occur that do not pass through a catalytic converter. Accordingly one can proceed with regard to the individual cylinder banks.

Overall it is possible in this manner, through selection of the arrangement of the catalytic converters and adjustment of the exhaust gas counter pressure resulting therefrom, to adjust the volumetric efficiency of the individual cylinders or cylinder banks as equally as possible, whereby due to targeted metering of the combustion gas volumes that are metered in the individual pre-chambers, only small differences need to be compensated for.

A method for compensating volumetric efficiency deviations in a mixture charged gas engine having at least two cylinders and/or at least two cylinder banks is also provided. A combustion gas volume supplied to the individual pre-chambers via a separate combustion gas supply is adjusted so that cylinder individual or cylinder bank individual volumetric efficiency deviations are compensated. Advantages arise hereby that have already been discussed in connection with the mixture charged gas engine.

In one embodiment of the method, the pre-chamber is provided as part of a spark plug, as already discussed in connection with the gas engine. The pre-chamber can be a thin-walled metal sleeve that is arranged on the spark plug and that is penetrated by the at least one firing channel.

The gas engine can be operated with natural gas, biogas, a special gas or another gas, such as a gas containing methane. Pure combustion gas, such as no air-/combustion gas mixture, can be admitted via the separate combustion gas supply into the pre-chamber.

A method can be provided such that in the fluid paths for the separate combustion gas supply of the pre-chamber, a valve is always arranged with the assistance of which a combustion gas volume admitted into the pre-chambers is adjustable. This can be implemented in that an opening degree, an opening point of time and/or an opening duration of the valves are adjusted, and can be cylinder individually or cylinder bank individually.

A method can also be provided such that at least one parameter for a cylinder specific or cylinder bank specific volumetric efficiency is captured, whereby the valves of the pre-chamber are controlled such that, depending on the value of the at least one parameter, cylinder individual or cylinder bank individual volumetric efficiencies are adjusted. The at least one parameter can be captured by a controller and the valves of the pre-chamber can be controlled by the same controller, dependent on the value of the at least one parameter. A combustion gas pressure in the separate combustion supply line that affects the combustion gas volume that is actually metered into the pre-chamber at a stored opening point in time and over a stored opening duration of a valve can also be considered when activating the valves.

In this context, a method can be provided such that an exhaust temperature, a nitrogen oxide emission and/or a cylinder pressure are captured as a parameter. This at least one parameter can be captured for each cylinder individually or for each cylinder bank. The exhaust temperature, the nitrogen oxide emission and also the cylinder pressure during the combustion cycle are hereby characteristic for the volumetric efficiency of the cylinder. Deviations in the volumetric efficiency can therefore be determined through changes in the respective parameters. The exhaust gas temperature of a cylinder increases hereby when the volumetric efficiency decreases, because in this case the combustion does not proceed at an optimum and, for this reason, the cylinder cannot convert the entire released thermal energy into mechanical energy. Accordingly, the exhaust gas then has a higher temperature.

It is clear that based on a controlled "overblowing" of the pre-chambers, in other words whereby if required an increased combustion gas volume or respectively any combustion gas at all is metered into the pre-chamber, cylinder specific deviations in the cylinder charge or respectively in the volumetric efficiency of the cylinders can be compensated. On cylinders having a poor volumetric efficiency, it is possible to increase the indicated efficiency of these cylinders through targeted enrichment of the mixture, in other words by adjusting a lower lambda value. This has a positive effect on the mechanical overall efficiency of the engine.

A method can also be provided such that cylinder individual or cylinder bank individual volumetric efficiency deviations are compensated in such a manner that all cylinders are operated closer to a knocking limit. In the case of a mixture charged gas engine where no measures are taken to compensate for volumetric efficiency deviations, the cylinders with a good volumetric efficiency determine the engine's knocking limit, whereas cylinders with an insufficient volumetric efficiency define the cylinder's misfiring limit. This means that possibly the operating point of the engine cannot be increased further in the direction of the knocking limit, for example in order to not gain greater efficiency from the cylinders with the insufficient volumetric efficiency, since otherwise the cylinders with the good volumetric efficiency already start to knock. Conversely, the operating point cannot be further reduced in the direction of the misfiring limit with a view to the cylinders having a good volumetric efficiency, because otherwise the cylinders that have an insufficient volumetric efficiency would already misfire. This imposes comparatively tight limits in the operating range of the engine. By compensating for the cylinder specific or cylinder bank specific deviations in the volumetric efficiency, these limits in the combustion development can be expanded. Since all cylinders then operate similarly far from a knocking limit or respectively from a misfiring limit in regard to their operating point, the overall operating point of the engine can be increased or decreased accordingly over a wider range. It is possible to extract altogether more efficiency from the engine by operating all cylinders closer to the knocking limit.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
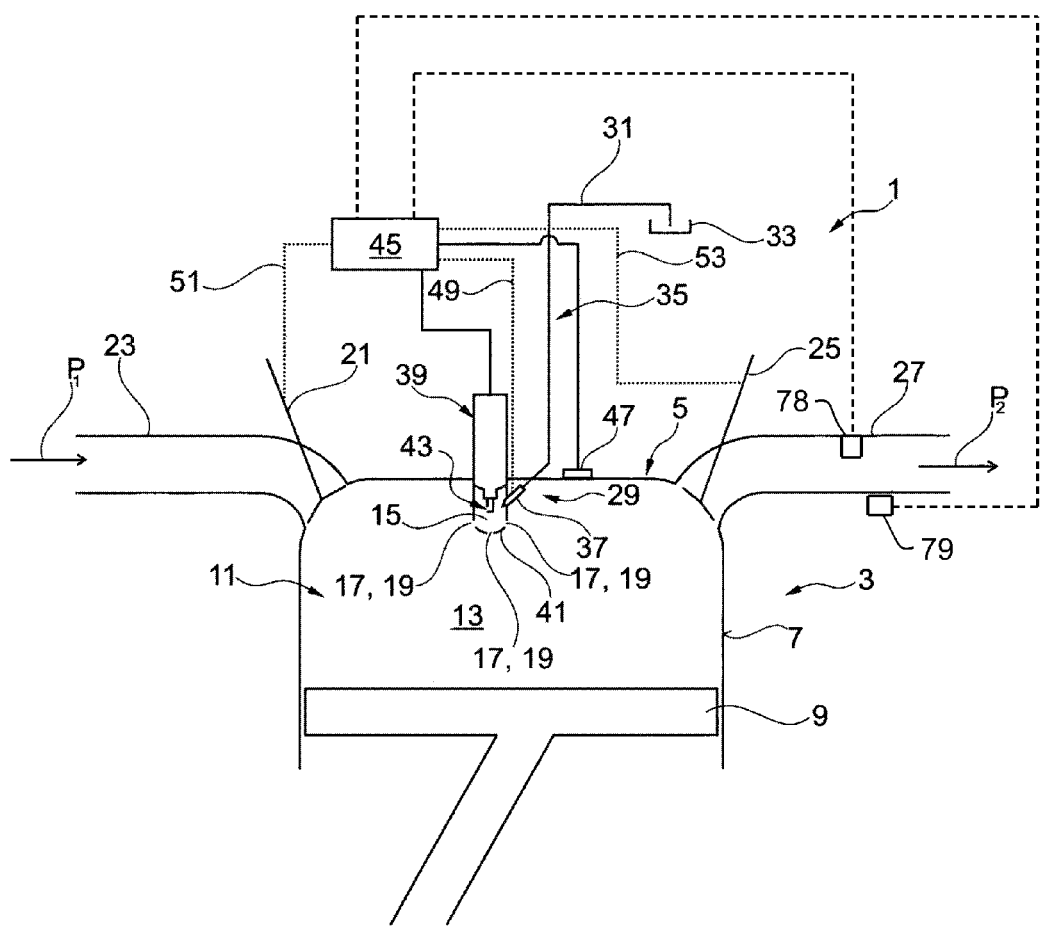
FIG. 1 is a schematic partial view of an embodiment of a mixture charged gas engine according to the present invention.

Referring now to the drawings, and more particularly to FIG. 1, a schematic partial detailed view of an embodiment of a mixture charged gas engine 1 is shown that includes at least one cylinder 3, wherein a combustion chamber 11, delimited by a cylinder head 5, a cylinder wall 7 and a piston 9 that is arranged movably in cylinder 3, is arranged in cylinder 3.

Combustion chamber 11 is divided into a main combustion chamber 13 and a pre-chamber 15, wherein pre-chamber 15 is fluidically connected via an opening 17 with main combustion chamber 13. In FIG. 1, three openings 17 in the embodiment of firing channels 19 are shown. Pre-chamber 15 is therefore connected with main combustion chamber 13 through a plurality of firing channels 19.

In an intake stroke of piston 9 an air-/combustion gas mixture—as symbolized herein by an arrow $P_1$—is admitted via an inlet valve 21 into main combustion chamber 13. For this purpose, a mixture line 23 can be provided through which the mixture is delivered to inlet valve 21 and via same further into main combustion chamber 13.

In one compression stroke, the mixture in main combustion chamber 13 is compressed and is pressed through firing channels 19 into pre-chamber 15. Subsequent ignition and combustion of the mixture occurs. In an exhaust stroke of piston 9, exhaust gas is forced from main combustion chamber 13 via an outlet valve 25 into an exhaust line 27 and is thus evacuated from main combustion chamber 13. This is illustrated in FIG. 1 by an arrow $P_2$.

Gas engine 1 includes a separate combustion gas supply 29 provided for pre-chamber 15. With the assistance of separate combustion gas supply 29, it is possible to admit combustion gas into pre-chamber 15 in addition to the air-/combustion gas mixture that is admitted into main combustion chamber 13, thus increasing the volumetric efficiency of cylinder 3. It is, in particular, possible to overblow pre-chamber 15, whereby additional combustion gas is admitted into main combustion chamber 13 via firing channels 19, thereby enriching the air-/combustion gas mixture that is admitted into main combustion chamber 13 via inlet valve 21. In this manner, it is possible to further increase the volumetric efficiency of cylinder 3, whereby in particular a cylinder 3 that has a poor volumetric efficiency can be improved and can be adapted to cylinders that from the outset have a better volumetric efficiency. But even if gas engine 1 only includes one single cylinder 3, it is possible for pre-chamber 15 with the assistance of the separate combustion gas supply 29 to improve the volumetric efficiency of cylinder 3.

Separate combustion gas supply 29 includes a fluid path 35, through which combustion gas can be admitted into pre-chamber 15. For this purpose, fluid path 35 can be connected via a fluid connection 31 with a storage container 33, such as a tank. No device for mixing the combustion gas with air is provided in fluid path 35, so that pure combustion gas is admitted to pre-chamber 15 via separate combustion gas supply 29.

A valve 37 can be arranged in fluid path 35 for separate combustion gas supply 29 with the assistance of which a combustion gas volume that is admitted into pre-chamber 15 is adjustable. Valve 37 can be a force-controlled or an electromagnetic valve. Fluid path 35 can consist of fluid connection 31 and valve 37. It is thereby shown that combustion gas from storage tank 33 can be admitted to pre-chamber 15 via fluid path 35, consequently via fluid connection 31 and valve 37.

In the design example of gas engine 1 illustrated in FIG. 1, the engine 1 features a pre-chamber spark plug 39. In this design, example pre-chamber 15 is designed as part of pre-chamber spark plug 39. It is, in particular, in the embodiment of a metal sleeve 41 that is provided on spark plug 39, wherein metal sleeve 41 is penetrated by firing channels 19. An electrode arrangement 43 for ignition of the combustible mixture is arranged in pre-chamber 15. Alternatively it is also possible that pre-chamber spark plug 39 is designed as a laser spark plug or as a Corona spark plug.

As is further explained with reference to FIG. 2, gas engine 1 can include a plurality of cylinders 3, such as two cylinder banks each having a plurality of cylinders 3.

A combustion gas volume admitted into pre-chamber 15 via separate combustion gas supply 29 can be adapted so that cylinder individual or cylinder bank individual volumetric efficiency deviations are compensated. It is, in particular, possible with the assistance of valve 37 to meter the combustion gas volume for pre-chamber 15 in order to increase the volumetric efficiency of cylinder 3. A mixture can hereby be produced in pre-chamber 15 that, compared to the mixture admitted into main combustion chamber 13, is more enriched with respect to stoichiometry. In particular, in order to keep pollutant emissions of the motor low, an as lean a mixture quality as possible in respect to stoichiometry is realized in main combustion chamber 13. A lambda value of approximately 1.7 can be set. Because of separate combustion gas supply 29, it is now possible to adjust a lambda value in the pre-chamber 15 in a range from the lower explosion limit to the upper explosion limit, such as at least 0.6 to a maximum of 1.2. On the one hand, the energy content in pre-chamber 15 is increased—in particular compared to an unflushed pre-chamber which is being supplied in a compression stroke of piston 9 with the mixture from main combustion chamber 13—whereby the boosting effect of the ignition energy is increased; on the other hand, due to the already described effect of overblowing pre-chamber 15, the mixture that is present in main combustion chamber 13 is being enriched or, respectively, the volumetric efficiency of cylinder 3 is being improved.

A controller 45 can be provided by which at least one parameter for a cylinder specific or cylinder bank specific volumetric efficiency can be captured. Valves 37 of pre-chambers 15 of various cylinders 3 are hereby controlled by controller 45 in such a manner that cylinder individual or cylinder bank individual volumetric efficiency deviations are adaptable through adjustment of the combustion gas volumes admitted into individual pre-chambers 15.

In the illustrated embodiment, a cylinder pressure can be captured by controller 45 as a parameter. A cylinder pressure sensor 47 is arranged on cylinder 3 for this purpose, with which controller 45 is connected in order to capture the cylinder pressure in cylinder 3.

Alternatively to the cylinder pressure that is captured with the assistance of cylinder pressure sensor 47, an exhaust gas temperature and/or nitrogen oxide emission can also be used as a parameter for control of valve 37. For this purpose, suitable sensors, shown as an exhaust gas temperature sensor 78 and a nitrogen oxide emission sensor 79, are provided in the region of cylinder 3 or, respectively exhaust, gas line 27 which are operatively connected with controller 45.

Controller 45 can adjust an opening degree, an opening point of time and/or an opening duration of valve 37 or, respectively, of a plurality of valves 37 of various cylinders 3. In this manner, the combustion gas volume admitted into pre-chambers 15 can be varied. Control can occur hereby depending on the at least one parameter, in this case therefore depending on the cylinder pressure that is captured with the assistance of cylinder pressure sensor 47. To activate valve 37, controller 45 can be connected to valve 37 via a first operative connection 49.

Pre-chamber spark plug 39 can also be controlled by controller 45, wherein controller 45 is connected with pre-chamber spark plug 39 for this purpose. Controller 45 can also be connected with inlet valve 21 via a second operative connection 51 and/or with outlet valve 25 via a third operative connection 53, so that these valves are also controllable through controller 45. It is, however, alternatively also possible that inlet valve 21 and/or outlet valve 25 are not force-controlled by controller 45, but instead, for example, through at least one cam shaft.

Figure 2:
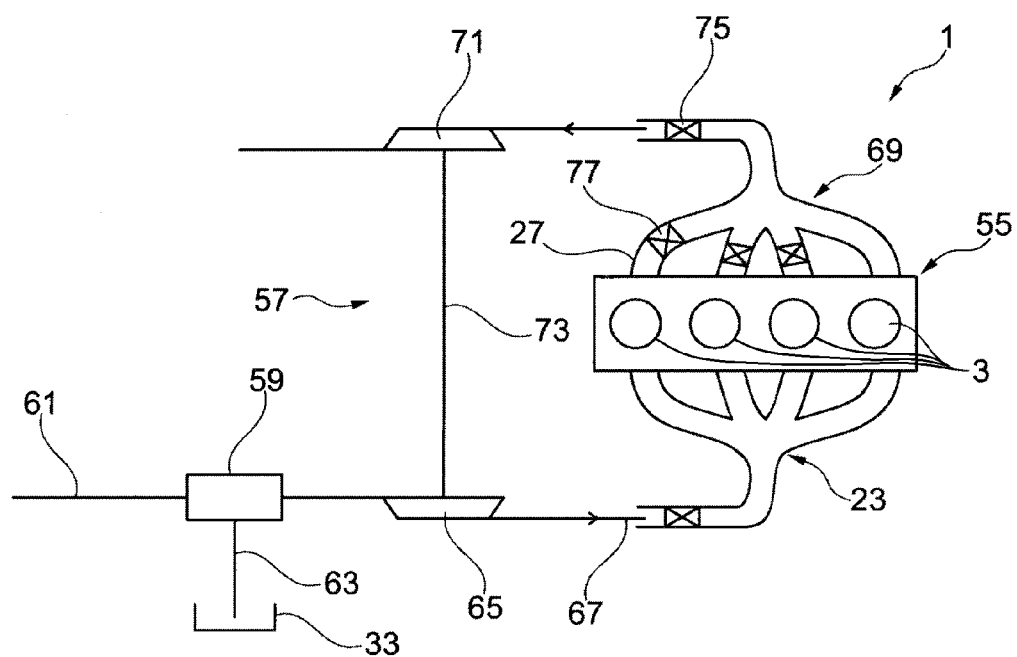
FIG. 2 is an additional schematic view of the gas engine shown in FIG. 1.

Referring now to FIG. 2, an additional schematic illustration of the design example of gas engine 1 according to FIG. 1 is shown. Same and functionally same elements are identified with the same reference numbers, so that in this respect reference is made to the previous description. In FIG. 2 it is indicated purely schematically that gas engine 1 includes a plurality of cylinders 3. Gas engine 1 can moreover be designed as a V-engine that includes two rows of cylinders 3 positioned parallel to each other that are arranged in the form of a V relative to each other. The design example of gas engine 1 includes thus two cylinder banks, whereby in FIG. 2 only one cylinder bank 55 is illustrated schematically for the sake of clarity.

FIG. 2 illustrates a turbo charger 57 which intakes an air-/combustion gas mixture 67 via a gas mixer 59, and compresses same.

On the one hand, combustion air 61 and on the other hand combustion gas 63, which can be from storage container 33, is admitted to gas mixer 59, wherein combustion gas 63 is mixed with combustion air 61 in gas mixer 59, wherein the mixture is supplied to a compressor 65 of turbo charger 57 and is compressed by same. From there, mixture 67 reaches mixture line 23 which is herein equipped with a distribution structure through which the mixture is delivered to various cylinders 3 of cylinder bank 55.

Via exhaust gas lines—of which herein only one is identified with reference number 27 for the sake of clarity—that are assigned to individual cylinders 3, exhaust gas comes into an exhaust gas manifold 69 which is connected fluidically via outlet valves 25 with cylinders 3; wherein exhaust gas manifold 69 is moreover fluidically connected with turbo charger 57, so that exhaust gas can flow from cylinders 3 via exhaust gas manifold 69 to turbo charger 57.

The exhaust gas flows hereby through a turbine 71 of turbo charger 57 and propels it to a rotational movement. Turbine 71 is operatively connected via a shaft 73 with compressor 65, so that compressor 65 is propelled by turbine 71 via shaft 73 into a rotational movement In the illustrated embodiment—viewed in flow direction of the exhaust gas—a first catalytic converter 75 is arranged before turbo charger 57 and after cylinders 3 which, in this case, is arranged centrally before the inlet into turbo charger 57. Therefore, all of the exhaust gas flowing from cylinders 3 must pass catalytic converter 75 in order to reach turbo charger 57.

In addition, a second catalytic converter 77 can be provided respectively after certain cylinders 3, whereby here only one of the second catalytic converters that are identified with reference number 77 is shown for the sake of clarity. It is possible, in particular, to cylinder individually vary the size of second catalytic converters 77. At the same time, it is clear that in FIG. 2 no catalytic converter 77 is provided on one of the cylinders 3. Central catalytic converter 77 is provided in particular so that no exhaust gas flow arises that has not passed through a catalytic converter.

In the illustrated embodiment, therefore, several comparatively small catalytic converters 75, 77 are arranged in the region of exhaust gas manifold 69, wherein the arrangement of catalytic converters 75, 77 is selected so that the exhaust gas counter pressure of catalytic converters 75, 77 acting upon individual cylinders 3 or individual cylinder banks 55 results in that differences in the volumetric efficiency between individual cylinders 3 or cylinder banks 55 are compensated. Second catalytic converters 77 can be arranged in compensators which serve to dampen vibrations and to compensate for thermal expansion of exhaust gas manifold 69.

This may, however, also be the case alternatively or in addition for first catalytic converter 75.

Gas engine 1 can be operated with natural gas, biogas, a special gas or another gas, such as gas containing methane. Pure combustion gas—in particular not an air-/combustion gas mixture—can be admitted via separate combustion gas supply 29 into pre-chamber 15.

Gas engine 1 can be designed as a piston engine. In one embodiment, gas engine 1 serves to drive heavy land or water vehicles, for example mining vehicles, trains, whereby gas engine 1 is utilized in a locomotive or a rail car, or ships. Also, utilization of gas engine 1 for driving military vehicles, for example tanks, is possible. One embodiment of gas engine 1 is also used in stationary operation, for example for stationary energy supply for emergency power supply, continuous load operation or peak load operation, whereby gas engine 1 can drive a generator. Gas engine 1 is also suitable for use in an engine based cogenerator for stationary energy production. Also, stationary use of gas engine 1 to drive auxiliary units, for example fire pumps on drilling rigs, is possible. Moreover, utilization of gas engine 1 in the field of transportation of fossil raw materials and in particular fuels, for example oil and/or gas, is possible. Utilization of gas engine 1 in the industrial field or in the construction field, for example in construction machinery, is also possible. Gas engine 1 can be in the embodiment of a diesel engine, a gasoline engine, a gas engine for operation with natural gas, biogas, special gas or another suitable gas.

Overall, a controlled overblowing of pre-chamber 15 is possible, whereby, if required, an increased combustion gas volume or respectively any combustion gas at all is metered into pre-chambers 15. This compensates cylinder specific deviations in the cylinder charge or, respectively, in the volumetric efficiency of cylinders 3. In particular, on cylinders 3 having a poor volumetric efficiency it is possible to increase the indicated efficiency of these cylinders through targeted enrichment of the mixture, in other words by adjusting a low lambda value. This has a positive effect on the mechanical overall efficiency of the engine. Cylinder individual or cylinder bank individual volumetric efficiency deviations can be compensated in such a manner that all cylinders are operated closer to a knocking limit.

Overall it is possible with the assistance of mixture charged gas engine 1 or, respectively, with the described method to efficiently compensate cylinder individual or cylinder bank individual volumetric efficiency deviations and to thereby realize a more favorable performance of the engine.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A mixture charged gas engine, comprising:
   at least one cylinder having a cylinder head and a cylinder wall;
   a piston movably arranged in said at least one cylinder, said piston, said cylinder head, and said cylinder wall delimiting a combustion chamber which includes a main combustion chamber;
   an inlet valve connected to said main combustion chamber, wherein said inlet valve admits an air-/combustion gas mixture into said main combustion chamber during an intake stroke of said piston;
   at least one pre-chamber including at least one firing channel that is fluidically connected with said main combustion chamber;
   a separate combustion gas supply provided for said at least one pre-chamber;
   at least one sensor configured to sense a volumetric efficiency parameter of said at least one cylinder;
   at least one valve arranged in a fluid path for combustion of said separate combustion gas supply and configured to allow an adjustable gas volume to be admitted into said at least one pre-chamber; and
   a controller coupled to said at least one sensor and said at least one valve, said controller including non-transitory executable instructions to:
   determine at least one of a cylinder specific volumetric efficiency and a cylinder bank specific volumetric efficiency from a volumetric efficiency parameter sensed by said at least one sensor;
   compare the at least one of said determined cylinder specific volumetric efficiency and said determined cylinder bank specific volumetric efficiency to a desired volumetric efficiency; and
   control said at least one valve to admit said adjustable gas volume into said at least one pre-chamber if the at least one of said determined cylinder specific volumetric efficiency and said determined cylinder bank specific volumetric efficiency is below said desired volumetric efficiency.

2. The mixture charged gas engine according to claim 1, wherein said at least one valve is at least one of a force-controlled valve and an electromagnetic valve.

3. The mixture charged engine according to claim 2, wherein said engine comprises at least two cylinders or at least two cylinder banks.

4. The mixture charged gas engine according to claim 3, further comprising an exhaust gas manifold fluidically connected with outlet valves of said at least two cylinders or said at least two cylinder banks and a turbo charger which is fluidically connected with said exhaust gas manifold, whereby exhaust gas flows to said turbo charger from said at least two cylinders or said at least two cylinder banks via said exhaust gas manifold.

5. The mixture charged gas engine according to claim 4, further comprising at least one catalytic converter assigned to at least one cylinder or at least one cylinder bank and arranged before said turbo charger in a flow direction of the exhaust gas such that an exhaust gas counter pressure of said at least one catalytic converter contributes to an equalization of a volumetric efficiency of said at least two cylinders or said at least two cylinder banks.

6. The mixture charged engine according to claim 2, wherein at least one of an opening degree, an opening point of time, and an opening duration of said at least one valve is adjustable.

7. A method for compensating volumetric efficiency deviations in a mixture charged gas engine, said method comprising:
   providing said mixture charged gas engine having at least two cylinders or at least two cylinder banks, said at least two cylinders or at least two cylinder banks each including:
   a cylinder head;
   a cylinder wall;
   a piston movably arranged in said at least two cylinders or said at least two cylinder banks, said piston, said cylinder head, and said cylinder wall delimiting a combustion chamber including a main combustion chamber;
   an inlet valve connected to said main combustion chamber, wherein said inlet valve admits an air-/combustion gas mixture into said main combustion chamber during an intake stroke of said piston;
   at least one pre-chamber including at least one firing channel that is fluidically connected with said main combustion chamber; and
   a separate combustion gas supply provided for said at least one pre-chamber;
   sensing at least one of a volumetric efficiency parameter of each of said at least two cylinders and said at least two cylinder banks via at least one sensor; and
   via a controller, determining the at least one of a cylinder specific volumetric efficiency and a cylinder bank specific volumetric efficiency from said sensed volumetric efficiency parameter;

comparing the at least one of said cylinder specific volumetric efficiency and said cylinder bank specific volumetric efficiency having been determined, to a desired volumetric efficiency; and controlling at least one valve to supply an adjustable gas volume to an individual one of said at least one pre-chamber if the at least one of said cylinder specific volumetric efficiency and said cylinder bank specific volumetric efficiency having been determined, is below said desired volumetric efficiency.

8. The method according to claim 7, wherein said at least one valve is at least one of a force-controlled valve and an electromagnetic valve.

9. The method according to claim 7, wherein said controlling step includes adjusting at least one of an opening degree, an opening point of time, and an opening duration of said at least one valve.

10. The method according to claim 7, wherein said volumetric efficiency parameter is at least one of an exhaust gas temperature, a nitrogen oxide emission, and a cylinder pressure.

11. The method according to claim 7, further comprising the step of compensating one of cylinder individual volumetric efficiency deviations and cylinder bank individual volumetric efficiency deviations so that all of said cylinders are operated closer to a knocking limit.

* * * * *